W. C. BRINTON, Jr.
CLUTCH.
APPLICATION FILED OCT. 28, 1915.
1,238,098.
Patented Aug. 28, 1917.
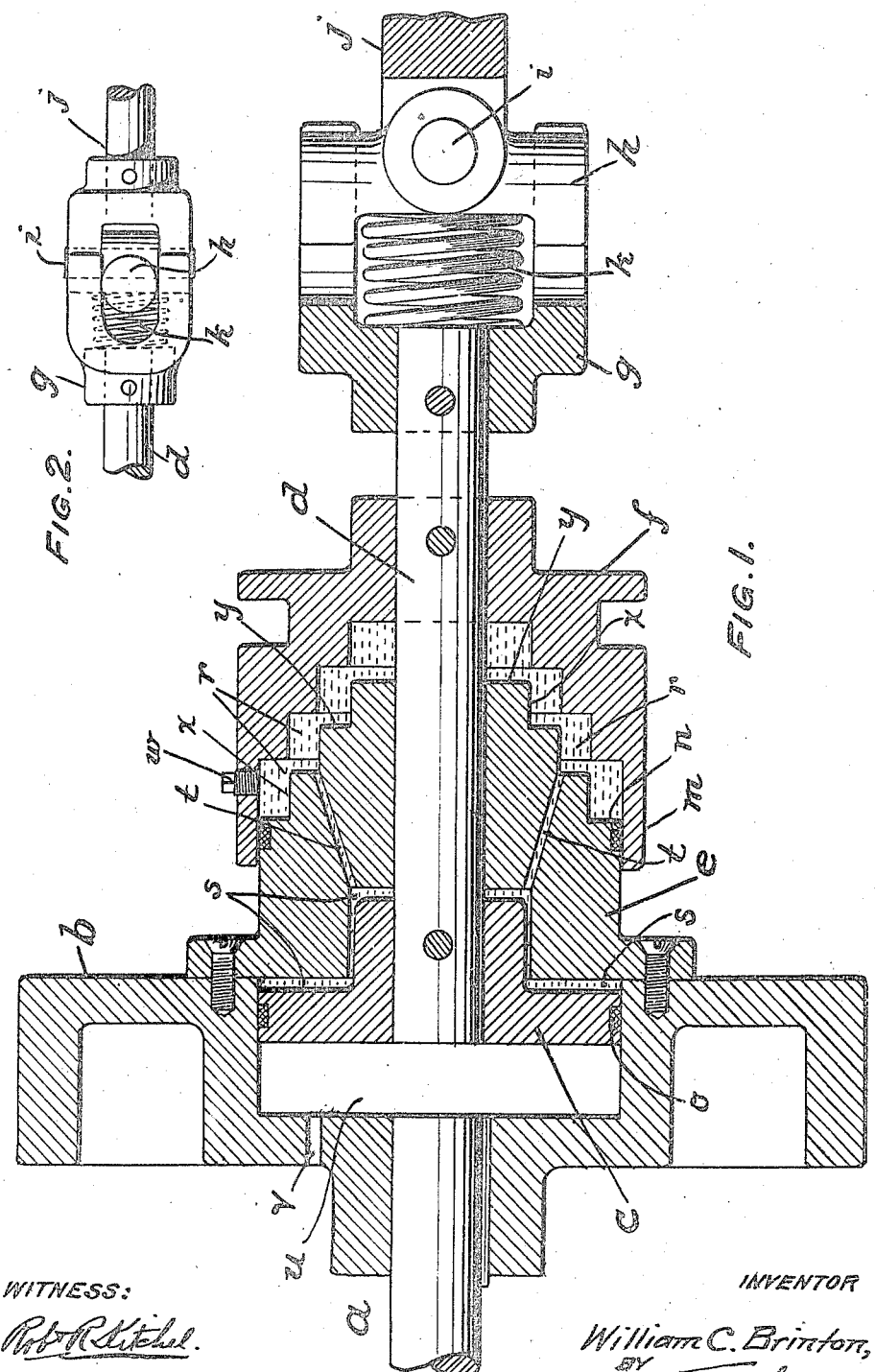

UNITED STATES PATENT OFFICE.

WILLIAM C. BRINTON, JR., OF KENNETT SQUARE, PENNSYLVANIA, ASSIGNOR TO PHILIPS-BRINTON COMPANY, OF KENNETT SQUARE, PENNSYLVANIA, A CORPORATION OF PENNSYLVANIA.

CLUTCH.

1,238,098.  Specification of Letters Patent.  Patented Aug. 28, 1917.

Application filed October 28, 1915. Serial No. 58,325.

*To all whom it may concern:*

Be it known that I, WILLIAM C. BRINTON, Jr., a citizen of the United States, residing at Kennett Square, county of Chester, and State of Pennsylvania, have invented a new and useful Improvement in Clutches, of which the following is a full, clear, and exact description, reference being had to the accompanying drawings, which form a part of this specification.

The object of my invention is to provide a clutch whose members may be brought into a driving relationship that will be effective under normal load conditions but which will be disrupted in the event of an abnormal increase in the load. A further object of the invention is to secure a more or less gradual application and withdrawal of the driving connection. More specifically, the object of my invention is to drive one clutch member from the other through a liquid medium without involving any displacement of the latter except that produced by the approximation of the clutch members.

A preferred embodiment of the invention is shown in the accompanying drawings, in which—

Figure 1 is a longitudinal section of a construction embodying my invention. Fig. 2 is a plan view, on a smaller scale, of that part of Fig. 1 showing the connection between the driven shaft and the driven element.

On the driving shaft $a$ is secured a fly wheel $b$, the peripheral part of which projects beyond the end of the shaft and affords a bearing for a disk $c$ secured to one end of a driven shaft $d$, which is arranged in line with shaft $a$.

Sleeved on the driven shaft $d$ is a driving clutch member $e$ having a peripheral flange which is bolted to the fly-wheel $b$. Secured to shaft $d$ beyond the driving clutch member $e$ is a driven clutch member $f$.

Secured to the far end of shaft $d$ is a yoke $g$ in sliding relation with which is a member $h$ which is connected by a pivot $i$ with the driven element $j$, which therefore rotates with the driven shaft $d$. The driven element is held from sliding relatively to the driving shaft $a$.

A spring $k$ is confined between the driven element and the end of the shaft $d$ and inner face of the yoke $g$ and tends to slide the shaft $d$ axially (to the left, Fig. 1) to apply the clutch. Suitable manual devices may be applied to the driven clutch member $f$ to shift it to the right to release the clutch.

The driven clutch member $f$ has a flange $m$ which surrounds the driving clutch member $e$. A suitable packing ring $n$ is arranged between this flange and the periphery of the driving clutch member $e$. Another packing ring $o$ is arranged between the periphery of the disk $c$ and the fly wheel $b$.

It will be observed that an inclosed space or chamber $r$ is formed between the two clutch members $e$ and $f$ and that another inclosed space or chamber $s$ is formed between the driving clutch member $e$ and the disk $c$. These two spaces are connected by channels $t$. Between the disk $c$ and the fly wheel $b$ is another inclosed space $u$ connected by a channel $v$ through the fly wheel $b$ with the atmosphere.

The opposing faces of the two clutch members $e$ and $f$, which together form the wall of the space $r$, have a like contour. As shown, they both are stepped in a complementary manner, the wall formed by each clutch presenting a series of faces $y$ extending in planes perpendicular to the axis of the shafts and a series of cylindrical faces $x$ extending in circular planes parallel to, or concentric with, the axis of the shaft, said cylindrical faces being each of a constant radius from end to end. The circular planes in which two corresponding circular faces of the two clutch members extend are nearly, but not quite, coincident, so that as the driven clutch member moves toward the driving clutch member, these faces will come into opposition and slide one upon the other but will not be brought into actual physical contact. Any two such opposing cylindrical faces are preferably of the same length so that, if the clutch members should be brought together so that opposing radially extending faces touch, a series of closed very shallow pockets would be formed between opposing cylindrical faces.

The inclosed spaces $r$ and $s$ are filled with a liquid. The liquid that I prefer to employ is glycerin or a mixture of glycerin and water, to which should be added some powdered asbestos. Any other liquid possessing like properties may be substituted. That is, the liquid should be more or less viscous and in cold climates or in cold seasons it should be non-freezing.

The combined volume of these spaces $r$ and $s$ is fixed, whatever the position of the driven clutch member, the only effect of its movement being to vary the relative capacities of the two spaces and displace liquid from one space to the other.

When the clutch is applied, that is, when the driven clutch member $f$ is moved to the left, thereby approximating the two clutch members, the volume of liquid remaining in chamber $r$ will be just sufficient to form between the opposing surfaces of the clutch members a thin film of the liquid. This film serves as a medium through which the rotary movement of the driving shaft is imparted to the driven element, the two clutch members acting as if they were mechanically connected.

In the event of any abnormal resistance to rotation of the driven element, the liquid will act as a yielding driving connection.

It will also be understood that the application of the clutch is somewhat gradual, the clutch members starting to grip before the driven member has reached its extreme movement to the left. So also, in releasing the clutch, the driven clutch member moves an appreciable distance to the right before the gradually diminishing driving connection is entirely disrupted.

To introduce the liquid into the space $r$ there is tapped in the flange $m$ a hole adapted to be closed by a screw plug $w$. The liquid may be removed through the same hole.

Having now fully described my invention, what I claim and desire to protect by Letters Patent is:

1. A clutch comprising a driving member and a driven member inclosing between them a space containing a suitable liquid, a portion of the inner wall of each member extending parallel to and relatively close to alinement with a portion of the inner wall of the other member, and means to impart to said members a relative movement in the direction of extension of said wall portions to contract said space and cause said parallel wall portions to form between them a thin space of gradually increasing superficial area between which a thin film of said liquid operates to operatively connect the two clutch members.

2. A clutch comprising a driving member and a driven member inclosing between them a space adapted to contain a suitable liquid, said members being slidable one upon the other to contract said space and thereby displace the liquid, a portion of the wall formed by each member presenting a face extending parallel to the direction of sliding and relatively close to alinement with a portion of the wall formed by the other member, said faces being arranged to extend the superficial area of the thin space confined between them as the main space is so contracted and operate, through the medium of the film of liquid formed between them, to effect a yielding driving connection between the clutch members.

3. A clutch comprising a driving member and a driven member inclosing between them a space containing a suitable liquid, a portion of the wall formed by each member presenting a face extending parallel to and relatively close to alinement with a portion of the wall formed by the other member, and means to impart to said members a relative movement in the direction of extension of said faces to expand and contract said space and thereby move said faces respectively out of and into opposing relationship.

4. A clutch comprising a rotatable member having a stepped inner wall one face of which extends concentric with the axis of rotation of said member and facing toward said axis and a second member rotatable on the same axis having a stepped wall one face of which extends concentric with and inside the first face and facing in the opposite direction, said walls inclosing between them a space adapted to contain a suitable liquid, said members being slidable one upon the other to contract said space, displace said liquid, and form a liquid film between said faces to effect a yielding driving connection between the clutch members.

5. A clutch member comprising a driving shaft, a driving clutch member secured thereto, a driven shaft in line with the driving shaft and rotatable and axially slidable in said driving clutch member, a driven clutch member secured to the driven shaft and slidable upon the driving clutch member to form between them an inclosed space adapted to contain a suitable liquid, a driven element rotatable with and movable axially relatively to the driven shaft, a spring confined between said driven element and the driven shaft tending to move the driven shaft and driven clutch member axially in a direction to contract said space, the faces of said clutch members inclosing said space being similarly shaped to cause said liquid, when said space is contracted, to form between said faces a thin film through the medium of which the clutch members are placed in driving relationship.

6. A clutch comprising a driving shaft, a fly wheel secured thereon, a longitudinally movable driven shaft in line with the driving shaft, a disk secured on the driven shaft, a driving clutch member sleeved on the driven shaft and secured to the fly wheel and forming between itself and the disk an inclosed space, a driven clutch member secured on the driven shaft and slidable upon the driving member and forming between the two members another inclosed space, and a channel connecting said spaces, said driven shaft being slidable toward and from the driving shaft to enlarge one space as the other is contracted, the walls formed by the two clutch members having faces adapted to be brought into close and parallel relationship when the space between them is contracted so as to form between them a film of liquid by means of which the rotation of the driving member is imparted to the driven member.

7. A clutch comprising a driving member and a driven member adapted to receive between them a suitable liquid, a portion of the surface of one member extending parallel to and relatively close to alinement with a portion of the surface of the other, and means to impart to said members a relative movement in the direction of extension of said surfaces to cause said parallel faces to form between them a thin space of gradually increasing superficial area between which a thin film of liquid operates to operatively connect the two clutch members.

In testimony of which invention, I have hereunto set my hand, at Philadelphia, on this 27th day of October, 1915.

WILLIAM C. BRINTON, Jr.